April 8, 1969   LE ROY D. HECOX   3,436,940
LOCKING WHEEL COVER
Filed Aug. 9, 1967
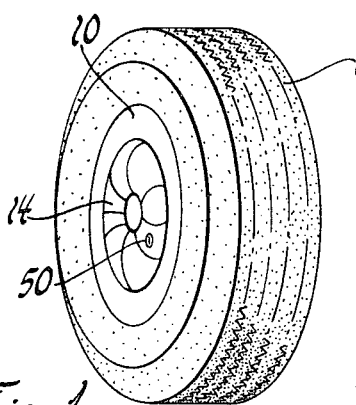
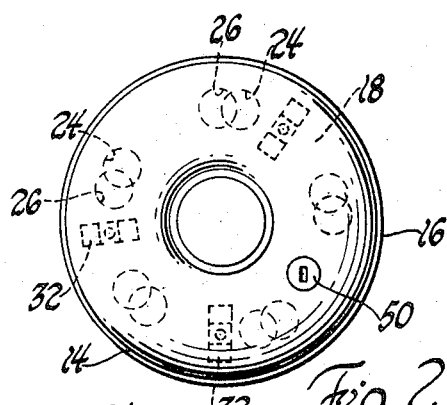
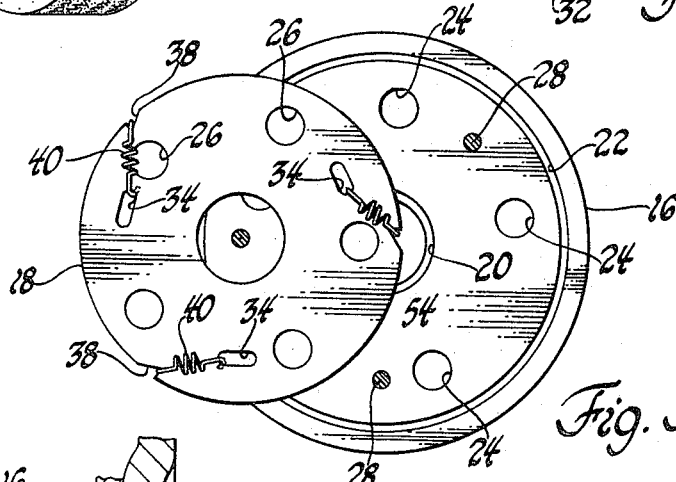
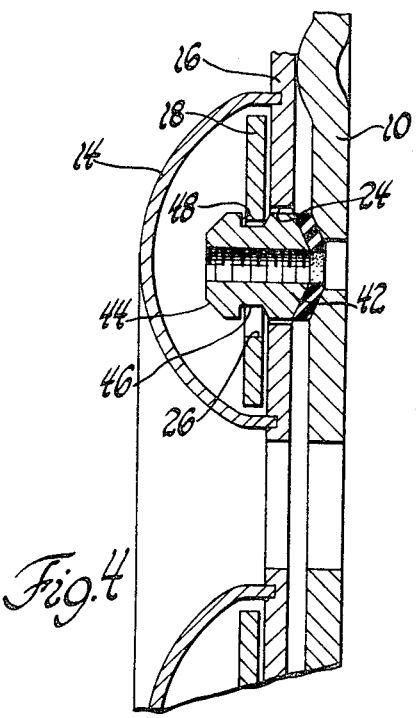
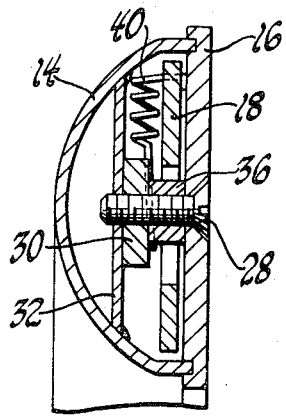
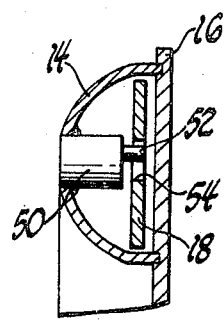
INVENTOR.
LeRoy D. Hecox
BY Dale A. Winnie
ATTORNEY United States Patent Office 3,436,940
Patented Apr. 8, 1969

3,436,940
LOCKING WHEEL COVER
Le Roy D. Hecox, 87 Thorpe, Pontiac, Mich. 48053
Filed Aug. 9, 1967, Ser. No. 659,509
Int. Cl. F16b 41/00
U.S. Cl. 70—232     3 Claims

ABSTRACT OF THE DISCLOSURE

An anti-theft device for vehicle wheels and wheel disc covers including a cover member having a pair of annular discs provided therebehind to receive the wheel retaining nuts in locking engagement therewith.

Background of the invention

This invention relates to anti-theft devices for vehicle wheels and wheel disc covers.

Vehicle wheels and their disc covers are usually made so that they are easily detachable to facilitate changing wheels and tires in emergency situations. However, it also makes the theft of vehicle wheels and their disc covers extremely easy and has created a serious crime rate problem in today's more affluent society which enables younger and less responsible persons to own cars and have need for such items without the means to buy them. The problem is particularly serious with new car dealers who are required to keep large inventories of unprotected new cars on storage lots.

Although there are locking wheel covers, which also serve to protect the vehicle wheels, most are quite complex and are therefore too expensive for the average car owner. Furthermore, they usually include means for locking the cover to the rim of the wheel and can be pried loose for access to the wheel, although the cover itself may be destroyed in the process. Accordingly, they are at best only a deterrent to wheel theft.

What is most needed is an anti-theft device which will prevent wheel theft and may also serve as a wheel cover or be adapted for use with wheel covers as a protection for them as well.

Brief summary of the invention

The preferred embodiment of this invention includes a torous-shaped member which is of a size to encircle and enclose the retaining nut for a vehicle therebehind. Within this member, which serves as a covered disc, are provided two annular disc members with circumferentially spaced openings positioned to receive the wheel nuts therewithin. The wheel nuts are formed with locking shoulders and one of the two annular discs is biased relative to the other to cause the openings for the wheel nuts to be offset just enough so that they can be brought into alignment to receive the wheel nuts and will then lock behind the shoulders provided on them.

The anti-theft device of this invention may be made in a small, sturdy and practically indestructible size, includes a minimum of parts and may therefore be reasonably inexpensive.

Even in its most functional form it is attractive and may be used as a wheel cover disc. However, if desired, the operative mechanism disclosed may be provided on the back side of larger and more ornamental covers equally as well.

A simple lock tumbler is used to unlatch the locking member and may make use of the ignition or truck key for the vehicle on which the wheel cover is provided. No complicated mechanism is required to be operated by the key operated device and accordingly the cost is nominal.

Description of the drawings

FIG. 1 is a perspective view of a vehicle wheel using the proposed anti-theft cover member.

FIG. 2 is a front elevational view of the wheel cover member itself with certain parts shown in dotted outline.

FIG. 3 is an exploded front elevation showing the two annular members within the outer cover member, which is removed.

FIG. 4 is an enlarged fragmentary cross section through the cover member as provided on a vehicle wheel.

FIG. 5 is a small cross sectional view of the wheel cover showing certain details of assembly.

FIG. 6 is a small cross sectional view showing how the wheel cover is unlatched from a vehicle wheel.

Detailed description

A vehicle wheel 10 is shown in the first drawing figure with a tire 12 provided on the wheel rim and a cover disc 14 provided on the outer side thereof. The cover disc is smaller than the wheel disc on which provided and is shaped like a doughnut flat against the wheel. This provides a simple, torous shape which is functional in that it has inherent strength and affords a space therebehind for the wheel retaining nuts obscured thereby.

Behind and within the protection of the cover disc member 14 is provided a pair of annular disc shaped members 16 and 18 which serve as the locking members for the wheel and cover. Actually, the one member 16 is larger than the torous cover member and is formed to close the back of the cover member by having annular grooves 20 and 22 near its inner and outer peripheries to receive the edges of the cover in engagement therewith. However, as will subsequently be appreciated, it is functionally behind and within the protection of the cover member and might actually be so provided if desired.

Between the cover member 14 and the annular member 16, which serves as a back plate for the cover, is provided the smaller annular disc member 18. It is disposed in parallel spaced relation behind the outer annular member and is relatively positionable about their common axis with respect thereto.

Each of the annular members 16 and 18 is formed to include a series of openings 24 and 26, respectively, which are circumferentially spaced and arranged in accord with the positions of the wheel retaining nuts on the vehicle wheel with which the anti-theft wheel cover member of this invention is to be used. They are all the same size and such as will receive the wheel nuts therethrough. Moreover, when the two annular members are properly oriented with respect to each other the wheel nuts may be received in the openings of both members together.

The outer annular member 16 is secured to the cover disc member 14 as best shown in FIG. 5, by means of threaded bolt fastener 28 received through the back side thereof and engaged with a receptive nut 30 or the like on a cross bar 32 spot welded or otherwise fastened to the inside of the cover member.

The smaller annular locking member 18 is formed to include elongated slots 34, circumferentially extended, through which the fastener means 28 for the outer member extend and which serve as guide slots for the relative positioning of the two members to align or offset the wheel nut openings 24 and 26, as is yet to be described. Small bushings 36 are provided about the threaded fasteners, as received through the guide slots 34, to protect the threads and to also serve as a spacer for the smaller annular member 18 allowing a degree of freedom of movement between the outer annular member 16 and the inner wall of the cover member near its peripheral edges, or the fastener means, whichever applies.

Referring to FIG. 3, the inner annular member 16 is shown to include notches 38 at spaced intervals on its outer peripheral edge and to have small tension springs 40 with one end engaged therein. The other end of these springs is formed for engagement with the fasteners 28 which secure the outer annular member 16 and the cover member 14 together. Accordingly, the springs serve to bias the inner annular member relative to the outer annular member so that the wheel nut receptive openings 24 and 26 are offset, as best shown in dotted outline in FIG. 2.

Although this form of biasing has been shown, it will be appreciated that leaf spring arrangements or other means for biasing the two annular members in circumferentially offset positions may be used, as desired.

Turning now to FIG. 4, the wheel retaining nuts 42 are shown to include a conical or tapered end 44 and to have an annular groove 46 provided therearound. The tapered end is to enable the retaining nuts to be received in the offset openings 24 and 26 of the two annular members and to cam the inner annular member into alignment with the outer annular member 16, against the resistance of the biasing force of the springs 40, so that the two annular members may be received on the wheel nuts together.

The first annular member 16 will be drawn into the annular groove 46 about the nuts as it passes thereover but is easily guided therebeyond since the cover member is secured to it and can be turned as necessary to keep the wheel nut openings in alignment. However, when the second annular member 18 is pulled into the annular grooves on the nuts, the assembly is locked in place. The first annular member centers the assembly on the wheel nuts and the biasing springs hold the inner annular member in locking engagement behind the shoulder 48 of the grooves on the wheel nuts.

The cover member is locked to the wheel nuts, the wheel nuts are protected behind the cover member and theft of the cover or the wheel is practically impossible.

To remove the cover member from the wheel a small lock tumbler 50 is mounted in the outer cover member and has an eccentric actuator 52 which projects into a small hole 54 in the locking member 18 so that it can be rotated back into alignment with the outer annular member, with the wheel nut openings together, and the whole assembly can be moved back off the wheel nuts.

I claim:
1. An anti-theft device for vehicle wheels, wheel covers and the like comprising:
   a wheel rim cover member suitably formed to be received within the rim of a vehicle wheel and for enclosing all of the retaining nuts for the wheel therebehind,
   wheel retaining nuts formed to include locking shoulders and for use with a vehicle wheel receptive of said wheel rim cover,
   and means provided on the inner disposed side of said wheel rim cover for snap lock shoulder holding engagement with said retaining nuts, upon engagement therewith, and for key lock actuated disengagement therefrom, said last mentioned means including; a member secured to the back side of said cover member for providing an enclosed space therebehind and having a plurality of circumferentially spaced openings receptive of said wheel retaining nuts therethrough, and an annular member disposed in said enclosed space and having openings provided therein for alignment with the openings in said back side member and spring means for holding said annular member axially centered and with said last mentioned openings relatively offset for shoulder locking engagement with said wheel nuts.

2. The anti-theft device of claim 1, including:
   a key operated cylinder lock mounted in said cover member and including means for turning said annular member against the bias of said spring means for disengagement thereof from said wheel nuts.

3. The anti-theft device of claim 1, including:
   a torous shaped cover member having a center opening for receiving the terminal end of a vehicle axle centrally therethrough and having a member secured to the inner side thereof annular in shape for closing said torous and receiving the inner and outer peripheral edges of said cover member in engagement therewith,
   means including a second annular member received in parallel spaced relation between said cover member and said first mentioned annular member and having like circumferentially spaced openings receptive of said retaining nuts therewithin,
   means engaged between said second annular member and one of said cover and first mentioned annular member for circumferentially biasing said annular members relative to each other and causing the circumferentially spaced openings therein to be relatively offset and for shoulder locking engagement of one thereof with said retaining nuts,
   and means accessible on the outer face of said cover member and engaged with said second annular member for the relative alignment of said annular members for disengagement from said retaining nuts.

References Cited

UNITED STATES PATENTS

| | | | |
|---|---|---|---|
| 2,124,035 | 7/1938 | Hurd | 70—169 |
| 2,896,440 | 7/1959 | Romsteadt | 70—258 |

MARVIN A. CHAMPION, *Primary Examiner.*

R. L. WOLFE, *Assistant Examiner.*